(12) United States Patent
Majewski et al.

(10) Patent No.: US 6,750,456 B1
(45) Date of Patent: Jun. 15, 2004

(54) OPTICAL COUPLER

(75) Inventors: Stanislaw Majewski, Grafton, VA (US); Andrew G. Weisenberger, Grafton, VA (US)

(73) Assignee: Southeastern Universities Research Assn., Inc., Newport News, VA (US)

( * ) Notice: Subject to any disclaimer, the term of this patent is extended or adjusted under 35 U.S.C. 154(b) by 300 days.

(21) Appl. No.: 09/577,701

(22) Filed: May 23, 2000

(51) Int. Cl.[7] ................................................. G01T 1/20
(52) U.S. Cl. ........................ 250/368; 250/366; 250/367
(58) Field of Search ................................ 250/366, 367, 250/368

(56) References Cited

U.S. PATENT DOCUMENTS

| | | | | | |
|---|---|---|---|---|---|
| 3,225,193 A | * | 12/1965 | Hilton et al. | ................ | 250/367 |
| 3,723,735 A | * | 3/1973 | Spelha et al. | ................ | 250/366 |
| 3,937,964 A | * | 2/1976 | Muehllehner | ................ | 250/366 |
| 5,059,798 A | * | 10/1991 | Persyk | ................ | 250/363.03 |
| 5,442,181 A | * | 8/1995 | Yamakawa et al. | ........ | 250/368 |

* cited by examiner

Primary Examiner—David Porta
Assistant Examiner—Shun Lee

(57) ABSTRACT

In a camera or similar radiation sensitive device comprising a pixilated scintillation layer, a light guide and an array of position sensitive photomultiplier tubes, wherein there exists so-called dead space between adjacent photomultiplier tubes the improvement comprising a two part light guide comprising a first planar light spreading layer or portion having a first surface that addresses the scintillation layer and optically coupled thereto at a second surface that addresses the photomultiplier tubes, a second layer or portion comprising an array of trapezoidal light collectors defining gaps that span said dead space and are individually optically coupled to individual position sensitive photomultiplier tubes. According to a preferred embodiment, coupling of the trapezoidal light collectors to the position sensitive photomultiplier tubes is accomplished using an optical grease having about the same refractive index as the material of construction of the two part light guide.

8 Claims, 3 Drawing Sheets

OPTICAL COUPLER

The United States of America may have certain rights to this invention under Management and Operating Contract DE-AC05-84ER 40150 from the United States Department of Energy.

FIELD OF THE INVENTION

The present invention relates to improved methods and apparatus for optically coupling pixilated scintillation arrays with position sensitive photomultipliers.

BACKGROUND OF THE INVENTION

It is known to provide a miniature gamma camera using an array of position sensitive photomultiplier tubes (PSPMTs) which camera includes a scintillator layer and a light guide of one type or another as an optical coupler between the scintillator layer and the individual PSPMTs. One of the problems with such miniature gamma camera devices is the existence of so-called "dead space" between adjacent individual PSPMTs in the array.

U.S. patent application Ser. No. 09/159,177 entitled "Mini Gamma Camera, Camera System and Method of Use" filed Sep. 23, 1998 describes an improved miniature gamma camera that utilizes an array of position sensitive, high resolution photomultiplier tubes PSPMTs coupled to a scintillation layer with a light guide that effectively eliminates the "dead space" between adjacent individual position sensitive photomultipliers in the array through the use of a diffusive light guide layer that, while partially successful at "dead space" effect elimination is not entirely satisfactory.

Among the proposed solutions to the "dead space" problem are the use of tapered fiber optic light guides between the scintillator layer and the PSPMTs that bypass the "dead space' or special designs that use scintillator pixel arrays with long transversely placed scintillation pixels above the "dead space" to form a bridge above and across the "dead space" with scintillation light being collected at both ends. Both of these proposed solutions are very difficult to implement in a practical and manufacturable device.

OBJECTS OF THE INVENTION

It is therefore an object of the present invention to provide a method for eliminating the "dead space" inherent in radiation sensitive camera and similar such devices that utilize an array of adjacent PSPMTs to receive the output of a scintillation layer via an optical coupling layer or device.

It is another object of the present invention to provide a radiation sensitive recording device that permits the elimination of the "dead space" between adjacent PSPMTs that receive the output of a scintillator layer or scintillator array via an optical coupling device.

It is yet another object of the present invention to provide a simplified optical coupler that eliminates the "dead space" in camera and similar devices that utilize an array of PSPMTs to receive the output of a scintillation layer or scintillator array via an optical coupling system.

SUMMARY OF THE INVENTION

According to the present invention there is provided an optical coupler for optically coupling a pixilated scintillator layer or array to an array of position sensitive photomultiplier tubes that utilizes a two-part optical coupling window comprising a first, uniform, planar spreader portion whose surface addresses the pixilated scintillator layer and optically coupled therewith a second layer comprising an array of trapezoidal light collectors individually optically coupled to the windows of an array of position sensitive photomultipliers. Incorporation of the novel optical coupler of the present invention into a miniature gamma camera is also described.

DESCRIPTION OF THE DRAWINGS

The present invention will be more fully understood from the detailed description given below and the accompanying drawings which are provided by way of illustration only, are not limitative of the present invention and wherein like numerals refer to like elements.

DETAILED DESCRIPTION

Figure 1:
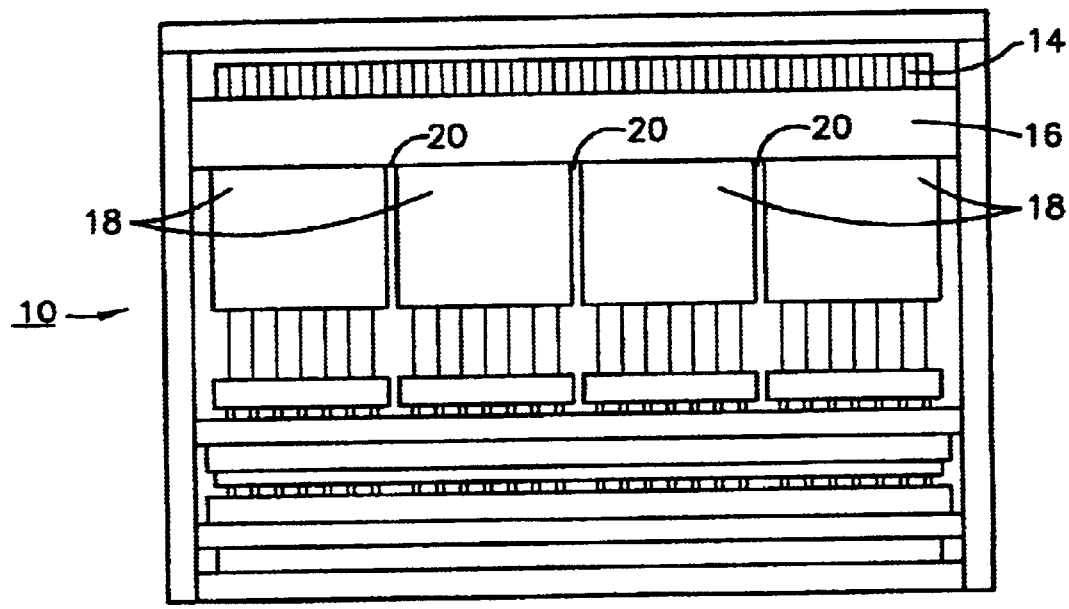
FIG. 1 is a schematic drawing of a radiation sensitive camera of the type in which the optical coupler of the present invention may find use.

As shown schematically in FIG. 1, a typical miniature scintimammography/gamma or other radiation sensitive camera system 10 comprises essentially, a pixilated scintillator layer 14, a light guide 16, and an array of position sensitive photomultiplier tubes 18. A variety of additional elements that receive, process, transmit and analyze the output of the PSPMTs also form part of the camera, but are not represented or identified here because their presence is not necessary to an understanding of the invention described herein. The essence of the present invention resides in the design and construction of light guide 16.

In the structure shown schematically in FIG. 1, so-called "dead space" occurs in the areas 20 that lie between adjacent PSPMTs 18. It is the elimination of such "dead space" that forms the focus of the present invention.

Figure 4:
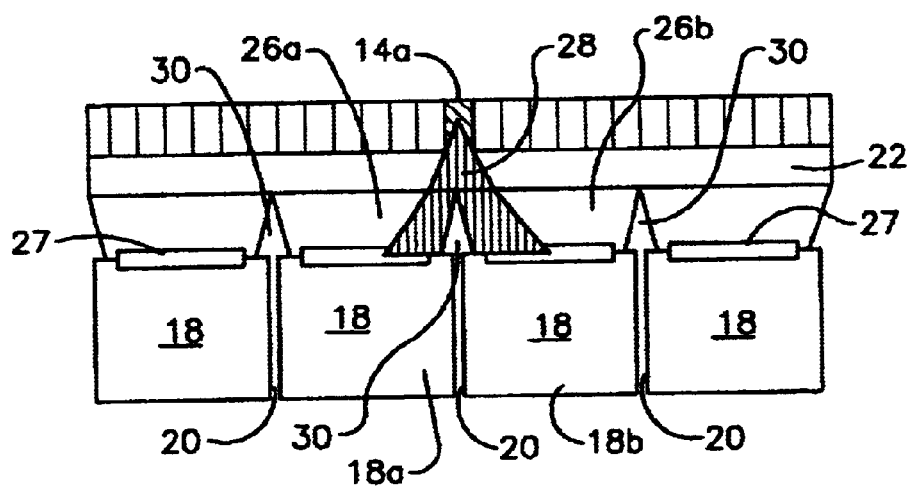
FIG. 4 is a detailed cross-sectional view of the optical coupler of the present invention schematically showing the performance thereof upon scintillation of a single pixilated element of a scintillator array and transmission of the energy thus generated to an underlying position sensitive photomultiplier tube.
Figure 2:
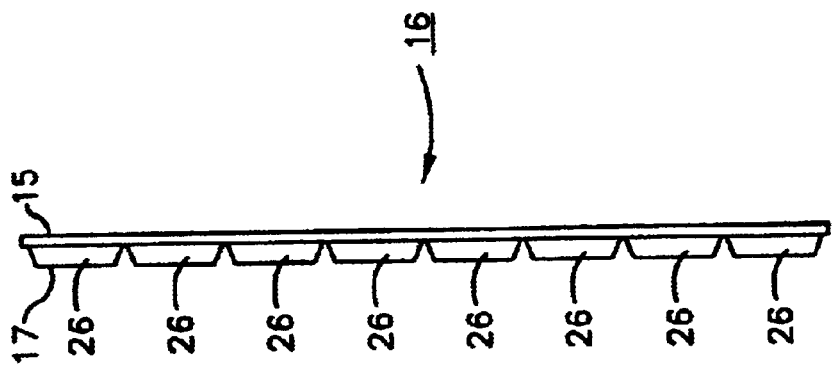
FIG. 2 is a side view of the optical coupler of the present invention.
Figure 3:
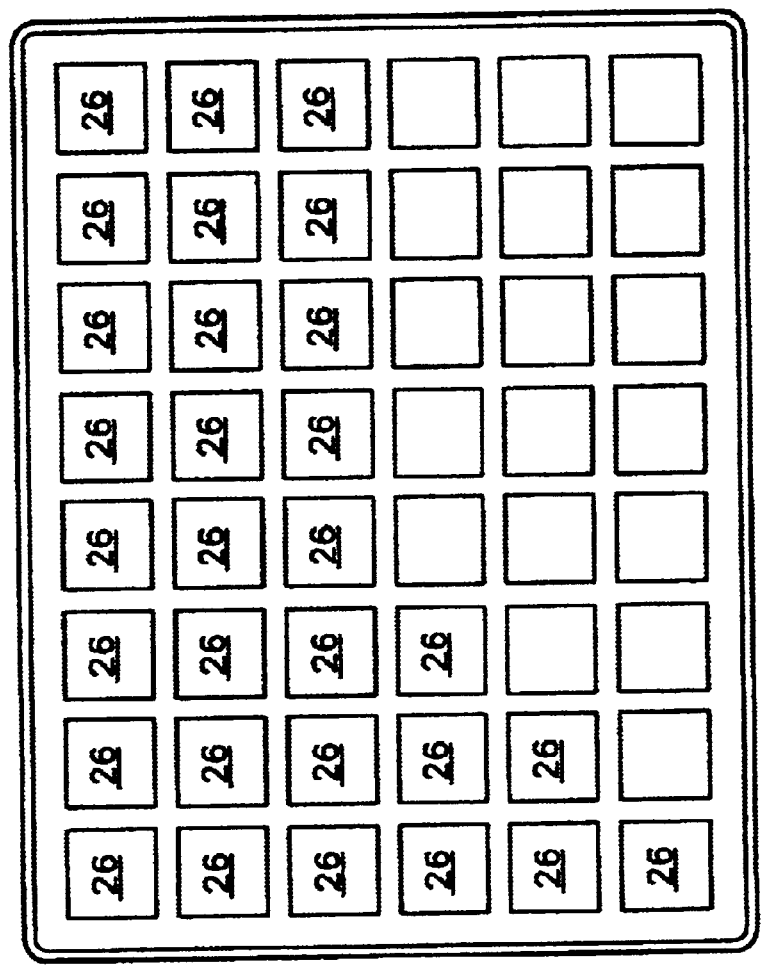
FIG. 3 is a rear view of the optical coupler of the present invention.
Figure 5:
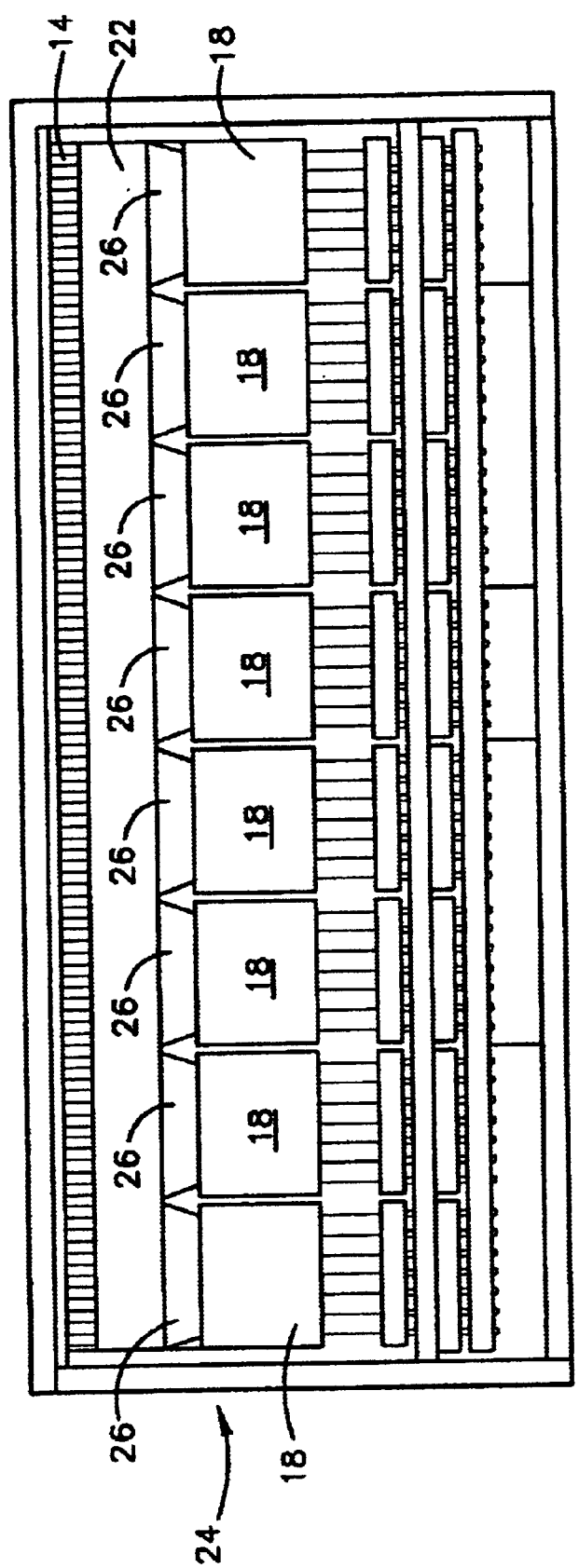
FIG. 5 is a schematic depiction of a miniature camera incorporating the optical coupler of the present invention.

The optical coupler of the present invention is best depicted in FIGS. 2 and 3. As shown in FIG. 2, light guide 16 of the present invention comprises a two part optical coupler or coupling window using a uniform spreading layer 22 whose surface 15, in a functional device, addresses scintillator layer or scintillator array 14 and an array 24 of trapezoidal light collectors 26 which are individually optically coupled to the windows 27 each of PSPMTs 18 of gamma camera 10 as shown in FIG. 4. This arrangement is also shown in FIG. 5 that schematically depicts a cross-sectional view of a camera or similar device 28 that incorporates the dual layer optical coupler 16 of the present invention in its operating position between scintillator array 14 and PSPMTs 18 (in this case, an array of PSPMTs that is 8 across). This arrangement will be described in greater detail below.

Referring now to FIG. 3 that shows a rear view, i.e. the view from the surface 17 of light guide 16 that addresses PSPMTs 18 in a functional device such as camera 28 (as shown in FIG. 5), it is readily seen that surface 17 presents an array 24 of individual trapezoidal light collectors 26 each of which will be individually optically coupled to the window 27 of a PSPMT 18 in a functional device or camera as shown in FIG. 4.

Referring now to FIG. 4 that depicts a small section of a gamma camera according to the present invention, excitation of a scintillator pixel 14a in registration with "dead space" 20 by the action of impinging gamma or other radiation causes the production of visible light 28 that is conventionally spread by layer 22 of optical coupler 16. At the point where visible light 28 spread by layer 22 intersects trapezoidal light collectors 26a and 26b it is split, spread and transmitted to individual PSPMTs 18a and 18b. The gap 30 between trapezoidal light collectors 26a and 26b straddling or spanning "dead space" 20 when combined with the transmission of visible light from scintillator pixel 14a to PSPMTs 26a and 26b results in virtually no loss of image or information in the area of scintillator pixel 14a that lies in registration with "dead space" 20.

Thus, an optimized light guide 16 made of two separate optical parts efficiently collects light from any pixel in scintillator array 14 including those pixels such as 14a that lie in registration with "dead space" areas 20. According to a preferred embodiment, trapezoidal light collectors 26 are 4.5 mm thick and have input sizes that match the overall physical dimensions of PSPMTs 18 that they address in the functional structure. The output sides, surface 17, of trapezoidal light collectors 26 are of a size to couple with the windows 27 of PSPMTs 26, hence matching the photocathode size. Thus, the input and output sizes of trapezoidal light collectors 26 will vary depending upon the overall physical dimensions of PSPMTs 18 as well as the photocathode size of the individual PSPMTs 18. The combined effect of this arrangement produces a very uniform response across the detector surface. Further enhancement of image uniformity across PSPMT windows 27 can be obtained using a variety of such devices that provide increased gain at their centers as opposed to their peripheral detection zones, thereby providing the means to equalize readings obtained from the edge regions, i.e. those areas near "dead spaces" 20, and the center regions of PSPMTs 18.

The use of a suitable optical coupling grease that matches the refractive index of the material of optical coupler 16 at the interface between surface 17 and windows 27 of PSPMTs 18 is specifically preferred. According to a preferred embodiment, optical coupler 16 is manufactured from an acrylic plastic material that provides optical quality surfaces at all points of light impingement and exhibits good radiation transmission at 420 nm. Acrylic materials having an index of refraction of about −1.4 have been found particularly suitable although suitably formed monolithic glass structures are equally useful providing a matching optical grease is provided at the coupling interface.

The array of PSPMTs 18 consists of an assembly of generally rectangular individual, position sensitive, high resolution photomultipliers 18. In the case of a preferred embodiment, each of the individual photomultipliers 18 is greater than about one inch square and contains at least 16 pixels or individual light receptors. According to a highly preferred embodiment, an array of from 4×4 up to 5×8 of such individual photomultipliers 18 arranged in a square or rectangle is used and performs as a single photomultiplier when appropriately connected as described in aforementioned U.S. patent application Ser. No. 09/159,177 or otherwise known in the art. The preferred photomultiplier device for use in such a camera is Model R5900U-00-C8 produced by Hamamatsu Photonics K.K., 314-5 Shimokanzo, Toyooka Village, Iwata-qun, Shizuoka-ken, 438-0193 Japan. These photomultiplier units are about 30 mm square and demonstrate an effective window area about 22 mm square.

A variety of data acquisition, image acquisition, generation, transmission and analysis and display tools and similar such peripheral enhancements may of course also be included as elements of the improved cameras and devices described herein, and such are well known in the art. The design and assembly of such additional camera elements are also well known in the art.

There has thus been described in a camera or similar radiation detection device comprising a pixilated scintillation layer, a light guide and an array of position sensitive photomultiplier tubes, wherein there exists so-called dead space between adjacent photomultiplier tubes the improvement comprising a two part light guide comprising a first planar light spreading layer or portion having a first surface that addresses the scintillation layer and optically coupled thereto at a second surface that addresses the photomultiplier tubes, a second layer or portion comprising an array of trapezoidal light collectors defining gaps that span said dead space and are individually optically coupled to the windows of individual position sensitive photomultiplier tubes. According to a preferred embodiment, coupling of the trapezoidal light collectors to the position sensitive photomultiplier tubes is accomplished using an optical grease having about the same refractive index as the material of construction of the two part light guide.

While the invention has been described primarily in connection with gamma sensitive cameras, it should be noted that the invention is similarly applicable in any camera or similar device used in the detection of radiation wherein incoming radiation impinges a pixilated scintillation layer to produce visible light that is subsequently detected by an array of position sensitive photomultiplier tubes.

As the invention has been described, it will be apparent to those skilled in the art that the same may be varied in many ways without departing from the spirit and scope of the invention. Any and all such modifications are intended to be included within the scope of the appended claims.

What is claimed is:

1. In a radiation sensitive device comprising a pixilated scintillation layer, an array of position sensitive photomultiplier tubes having windows and a light guide optically coupling said pixilated scintillation layer and said array of position sensitive photomultiplier tubes and wherein there exists so-called dead space between adjacent photomultiplier tubes, the improvement comprising:

a two part light guide comprising a first planar light spreading layer or portion having a first surface that addresses the scintillation layer and optically coupled thereto at a second surface that addresses the photomultiplier tubes, a second layer or portion comprising an array of trapezoidal light collectors defining gaps that span said dead space and are individually optically coupled to the windows of individual position sensitive photomultiplier tubes.

2. The radiation sensitive device of claim 1 wherein said trapezoidal light collectors are optically coupled to said windows of said position sensitive photomultiplier tubes with an optical grease having an index of refraction about equal to that of the material of construction of said trapezoidal light collectors.

3. The radiation sensitive device of claim 1 wherein said optical coupler is fabricated from an acrylic polymer.

4. The radiation sensitive device of claim 1 that is a camera sensitive to gamma radiation.

5. The radiation sensitive device of claim 4 wherein said trapezoidal light collectors are optically coupled to said windows of said position sensitive photomultiplier tubes with an optical grease having an index of refraction about equal to that of the material of construction of said trapezoidal light collectors.

6. An optical coupler for optically coupling a pixilated scintillation layer and an array of adjacent position sensitive photomultiplier tubes each having outer physical dimensions and a window comprising:

a) a first generally planar spreader layer having a first surface that addresses the pixilated scintillation layer in a functional device and optically coupled thereto at a second opposing surface that addresses the position sensitive photomultiplier tubes in a functional device;

b) a second layer comprising an array of trapezoidal light collectors each having a base proximate said first generally planar spreader layer that is of about the same dimensions as the outer physical dimensions of said position sensitive photomultiplier tubes and an extremity that is remote from said first generally planar spreader layer that is of about the same dimensions as the windows of said position sensitive photomultiplier tubes.

7. The optical coupler of claim 6 fabricated from an acrylic polymer.

8. The optical coupler of claim 7 wherein said first generally planar layer is about 4.5 mm in thickness.

* * * * *